May 18, 1943.  F. ALABRUNE  2,319,485
MECHANICAL MOVEMENT
Filed Aug. 26, 1941
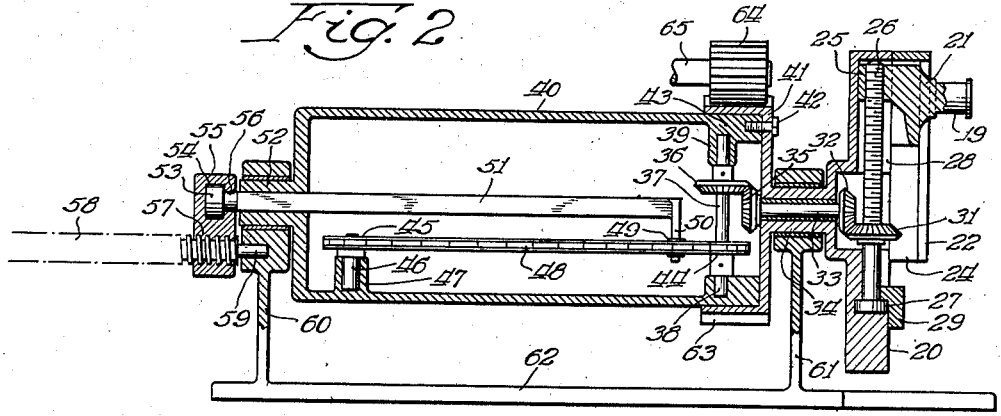
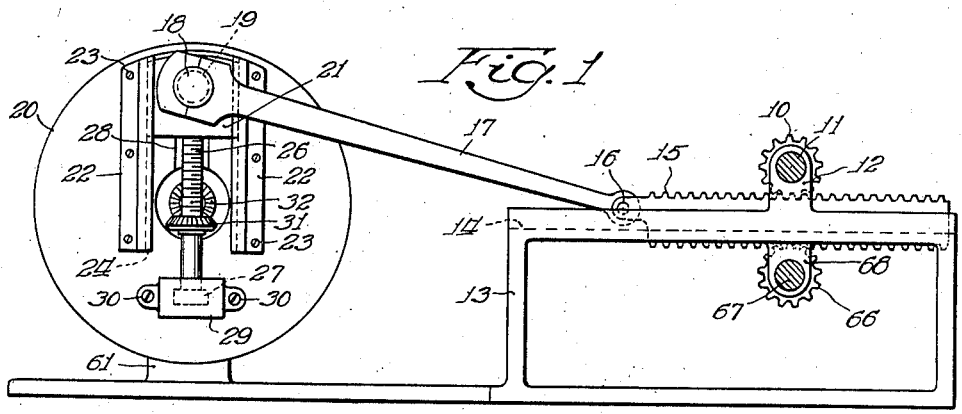
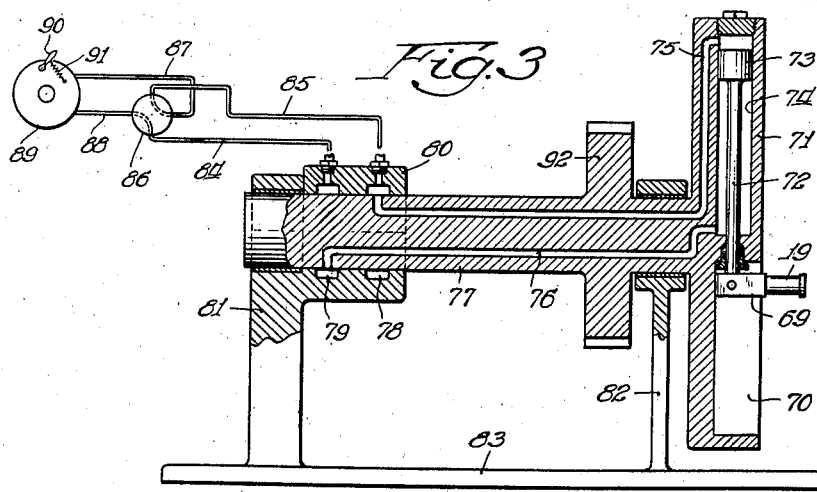
Inventor:
François Alabrune
By A. Trevor Jones
Atty.

Patented May 18, 1943

2,319,485

UNITED STATES PATENT OFFICE 2,319,485

MECHANICAL MOVEMENT

Francois Alabrune, Chicago, Ill.

Application August 26, 1941, Serial No. 408,343

4 Claims. (Cl. 74—600)

This invention relates to a mechanical movement.

Broadly, the invention contemplates the combination with an element rotatable on an axis, of a member carried by the element and positive means for moving the member radially from and toward the axis of the element during rotation of the element.

One form of the invention and illustrative expedients for utilizing the same are shown in the accompanying drawing, in which—

Figure 1 shows an elevational view of a form of mechanism embodying the invention;

Figure 2 is an axial sectional view of parts shown in Fig. 1 with one form of operating means therefor; and Figure 3 is another form which may be employed alternatively with that of Fig. 2.

Referring to the drawing in detail, there is represented a pinion 10 which it may be desired to oscillate on its axis 11 through either a small arc at a slow speed or through a larger arc at higher speed. By means of my invention the pinion 10 may be rotated thus selectively from nothing up to a given maximum, through varying degrees, by connecting the pinion with a member, in this instance, a crank pin, uniquely carried, in accordance with my invention, by an element, in this instance a crank disc. It will be understood that the rock shaft 11 of the pinion 10 may be connected with any desired tool or the like, as the application of my invention by those skilled in the art may suggest, and not here shown.

The rock shaft 11 of the pinion 10 may be suitably journaled in a bracket 12 carried by a table 13 in which, sliding in a groove 14, is a rack 15 which meshes with the pinion 10. For reciprocal movement of the rack, one end thereof is articulated as at 16 with a pitman 17.

In accordance with my invention, the pitman 17 at its other end is pivoted at 18 on crank pin 19, the crank pin being carried as more particularly presently described, by the crank disc 20 and being movable radially of the crank disk toward and from the axis thereof during rotation of the disc. Since, as here shown, the crank pin 19 may, in one of its radial positions, be co-axial with the disc 20, and, in another of its radial positions, may be near the periphery of the disc, with an infinite number of possible positions therebetween, the stroke of the rack 15 may be varied from zero, when the crank pin is at the axis of the disc 20, to a maximum as shown in Fig. 1.

Turning to the first embodiment shown in Figs. 1 and 2 of the drawing, the crank pin 19 is shown formed integral with a shoe 21 slidable radially with respect to the disc 20 between guides 22 which may be fastened to the face of the disc as by screws 23, and which lap the face of the shoe 21 as by the dove-tail sliding connection 24. The shoe 21 has a heel 25 extending farther into the disc 20 and threadedly perforated to receive therethrough the screw shaft 26, the screw shaft having a bearing 27 at one end in the disc 20 at a point beyond the axis of the disc with respect to the shoe 21. At its other and screw threaded end where it engages the heel 25 of the shoe, the screw shaft turns in the slot 28 which is radially and axially aligned with a center line between the guides 22. The bearing 27, as here shown, may be of a type which requires a minimum of bearing for the screw shaft at the peripheral end, so as to permit the shoe 21 to move to the extreme end of the shaft 26, a journal block 29 secured to the face of the disc 20, as by screws 30, completing a journal box for the bearing 27 which is thus in the nature of a cantilever support for the screw shaft.

From the foregoing it will be apparent that rotation of the screw shaft 26 in one direction or the other will cause the shoe 21 and crank pin 19 to move radially either toward or from the axis of the disc 20, and I will next describe the means illustrated in Figs. 1 and 2 to accomplish this during rotation of the disc 20.

A bevel pinion 31 fixed on the screw shaft 26 meshes with another bevel pinion 32 fixed on a stub shaft 33 which passes rotatably through the journal 34 of the crank disc 20. At the other end of the stub shaft 33 is fixed another bevel pinion 35 which meshes with a bevel pinion 36 fixed on the spindle 37 transverse to the stub shaft 33. The spindle 37 is rotatably mounted in bearings 38 and 39 formed upon the interior of the hollow axle 40 which is closed at this end by the cup-shape plate 41 conveniently formed as an enlargement of the disc journal 34 and secured by screws 42 at the end of the hollow axle 40, inwardly directed enlargements 43 of the axle receiving the screws therein and also providing the bearings for the spindle 37. The latter also has fixed thereon a sprocket wheel 44 aligned with another sprocket wheel 45 at the opposite end of the axle interior, the wheel 45 being rotatable on a stud 46 fixed in bearing 47 on the inner face of the axle. About the sprocket wheels 44 and 45 and meshing therewith is trained an endless link chain 48 to one of the links of which is fastened as at 49 a finger 50. Rigidly secured to the finger 50 is a bar 51 which extends exteriorly of the axle 40, passing rearwardly co-axially through the other journal 52 for the axle 40 and terminating in a cylindrical head 53 snugly but rotatably received in a cylindrical recess 54 in the traveler block 55. The bar 51 may be flat where it passes through the hollow axle 40 and its journal 52, but is cylindrical at 56 where it enters the traveler block 55 adjoining the head 53, since the bar 51 turns with the axle 40 but not relative thereto, while the parts 53 and 56 rotate in the traveler block, the bar 51 rotating on an axis coinciding with the axis of the axle 40. The traveler block 55 is threadedly perforated as at 57 to receive therethrough the screw shaft 58 which has a bearing at 59 in the bearing pedestal 60 for the axle journal 52. At the other end of the axle, the axle journal 34 has a similar bearing in a similar pedestal 61, these pedestals 60 and 61 rising from the base 62 to support the crank disc and its axle 40 rotatably.

Conveniently formed integrally with the plate 41 which thereby forms a hub therefor, the axle 40 may have external gear teeth 63 at one end thereof which mesh with a driving pinion 64 on a driving shaft 65, this driving shaft being suitably supported and connected with any prime mover or source of power not here necessary to be described.

So constructed and arranged, it will be apparent that through the driving pinion 64 and the hollow axle 40, the crank disc 20 may be rotated on its axis and that this rotation, through the crank pin 19 and pitman 17, may be changed into reciprocating motion. During this operation, if the screw shaft 58 be stationary, the parts carried by the disc 20 and the axle 40, as described, rotate with the disc and axle but not relatively thereto, while yet the end parts 53 and 56 of the bar 51 rotate relatively to the traveler block 55. If, now, it be desired to change the length of stroke of the rack 15, the screw shaft 58 may be rotated say by hand, by any suitable attachment (not shown), and rotation of this screw shaft in the appropriate direction will cause the traveler block 55 to move say, in Fig. 2, rearwardly on the screw shaft 58, drawing with it the bar 51 while this bar is still rotating. The bar 51 in turn will pull one side (depending on which side the finger 50 is affixed to) of the endless link chain 48 to rotate the pinions 36, 35, 32 and 31 to in turn rotate the screw shaft 26 and thus cause the shoe 21 and with it the crank pin 19 to move toward the axis of the disc 20.

By means of the present invention, no stoppage of the disc is required for this radial movement of the crank pin, and it will be apparent that during such radial movement the crank pin describes a spiral course about the axis of the disc 20 so that the change in the length of the stroke of the rack 15 is gradual whether this change be continuously progressive or intermittent.

If desired, the rack 15 may have teeth to engage the pinion 10 on its upper side and teeth also on its lower side to engage another pinion 66, the shaft 67 of which is carried by a bracket 68 depending from the table 13. With two pinions 10 and 66, the useful work of the rack may be enhanced, since the shafts 11 and 67 might be arranged to do useful work during their respective rotations in one direction and to merely idle during their reverse rotations, the shaft 11, for example, doing useful work during movement of the rack to the right and idling during return movement of the rack to the left, while the shaft 67 could idle during movement of the rack to the right and do useful work on return movement of the rack toward the left.

Turning now to Fig. 3, as an alternative, I have shown hydraulic means for moving the crank pin 19. In this embodiment the crank pin is mounted on a shoe 69 sliding in a slot 70 in the disc 71, the shoe being fixed on a piston rod 72, the piston 73 of which is reciprocal in a chamber 74 in the crank disc 71, under the influence of a non-compressible circulating medium such as oil under pressure. A duct 75 communicates with one end of the chamber 74 and a duct 76 with the other end, these ducts passing rearwardly through the axle 77 of the disc 71 and opening at their rear ends into annular ports 78 and 79 for the ducts 75 and 76 respectively. These annular cylindrical ports 78 and 79 are formed in a valve block 80 which encircles the axle 77, but does not turn with the axle, the valve block being conveniently formed integral with the pedestal 81 which rotatably supports the rear end of the axle 77, the front end of the axle being journaled in the pedestal 82, which pedestals rise from the base 83. The ports 79 and 78 are at all times in communication with pipes 84 and 85 respectively, which latter are in communication through the four-way valve 86 with pipes 87 and 88 leading to the motor driven pump 89. A switch actuating handle 90 on the motor pump 89 may be moved to "on" position to put the motor in operation to drive the pump, and when released, is desirably retracted to "off" position by a spring 91.

When the four-way valve 86, which may be controlled by a suitable handle not shown, is placed in one of its selective ninety-degree positions, it connects, as shown in dotted lines in Fig. 3, the output pipe 87 of the pump with the pipe 85, and the return pipe 88 is at this time connected with the pipe 84. Thus, operation of the pump which may propel the oil, moves the piston 73 toward the axis as long as the switch 90 is held in "on" position. When the piston 73 has reached the limit of its movement toward the axis of the disc, so that the crank pin 19 is at the limit of its movement away from the axis of the disc and it is desired to move the crank pin toward the axis again, the four-way valve 86 is actuated through ninety degrees of its movement to connect the output pipe 87 of the pump with the pipe 84 and the return pipe 88 with the pipe 85. The direction of flow of the hydraulic medium in the chamber 74 is thus reversed and the piston moved toward the periphery of the disc to move the crank pin toward the axis.

The axle 77, in this instance, may be solid except for the ducts 75 and 76, and may have integral therewith the gear wheel 92 which may be driven by a driving pinion such as 64 already referred to, which then causes common rotation of the axle 77 and disc 71 with the crank pin 19 and control mechanism for the crank pin, while at the same time during rotation of the crank disc the crank pin may be moved toward or away from the axis.

Manifestly, the invention is not limited to the exemplary embodiments here specifically shown and described, and such changes may be made as fall within the scope of the following claims without departing from the invention.

Having described my invention, I claim:

1. In a mechanical movement employing a rotatable crank and a pin carried thereon and hydraulically actuated means for moving the pin radially of the crank while the crank is rotating, that improvement therein comprising a chamber in the crank, a piston rod carried by the crank connected at its outer end with the pin, a piston on the piston rod at its inner end within said chamber, a rotatable axle carrying the crank, ducts in the axle communicating with opposite ends of said chamber respectively, a valve block encircling the axle, annular ports in the valve block communicating at all times with said ducts respectively, a source of circulating medium under pressure, pipes leading from said source to said ports respectively, and means whereby the direction of flow of the circulating medium may be selectively reversed.

2. In a mechanical movement employing a rotatable crank and a movable pin carried thereon and hydraulically actuated mechanism for moving the pin radially of the crank while the crank is rotating, that improvement therein comprising a chamber in the crank, a piston rod carried by the crank connected at its outer end with the pin, a piston on the piston rod at its inner end within said chamber, a rotatable axle carrying the crank, ducts in the axle communicating with opposite ends of said chamber respectively, a source of circulating medium under pressure, means communicating at all times between said source and said ducts respectively, and means whereby the direction of flow of the circulating medium may be selectively reversed.

3. In a mechanical movement employing a rotatable crank and a movable member carried thereon and hydraulically or the like actuated mechanism for moving the member radially of the crank while the crank is rotating, that improvement therein comprising a chamber in the crank, a piston carried by the crank in said chamber connected with the pin, a rotatable axle carrying the crank, a duct in the axle communicating with said chamber, a valve block abutting the axle, the axle being rotatable with respect to the valve block, a port in the valve block communicating at all times with said duct, a source of circulating medium under pressure, and means communicating between said source and said port.

4. In a mechanical movement employing a rotatable crank and a movable member carried thereon and hydraulically actuated mechanism for moving the member radially of the crank while the crank is rotating, that improvement therein comprising a chamber in the crank, a piston rod carried by the crank connected at its outer end with the member, a piston on the piston rod at its inner end within said chamber, a rotatable axle carrying the crank, ducts in the axle communicating with opposite ends of said chamber respectively, a valve block abutting the axle, ports in the valve block communicating at all times with said ducts respectively, a source of circulating medium under pressure, means communicating between said source and said ports respectively, and a four-way valve interposed in said means whereby the direction of flow of the circulating medium may be selectively reversed.

FRANCOIS ALABRUNE.